Figure 5:
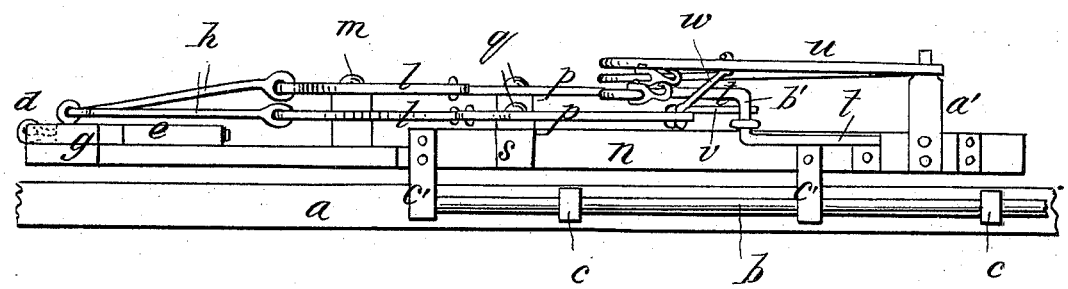

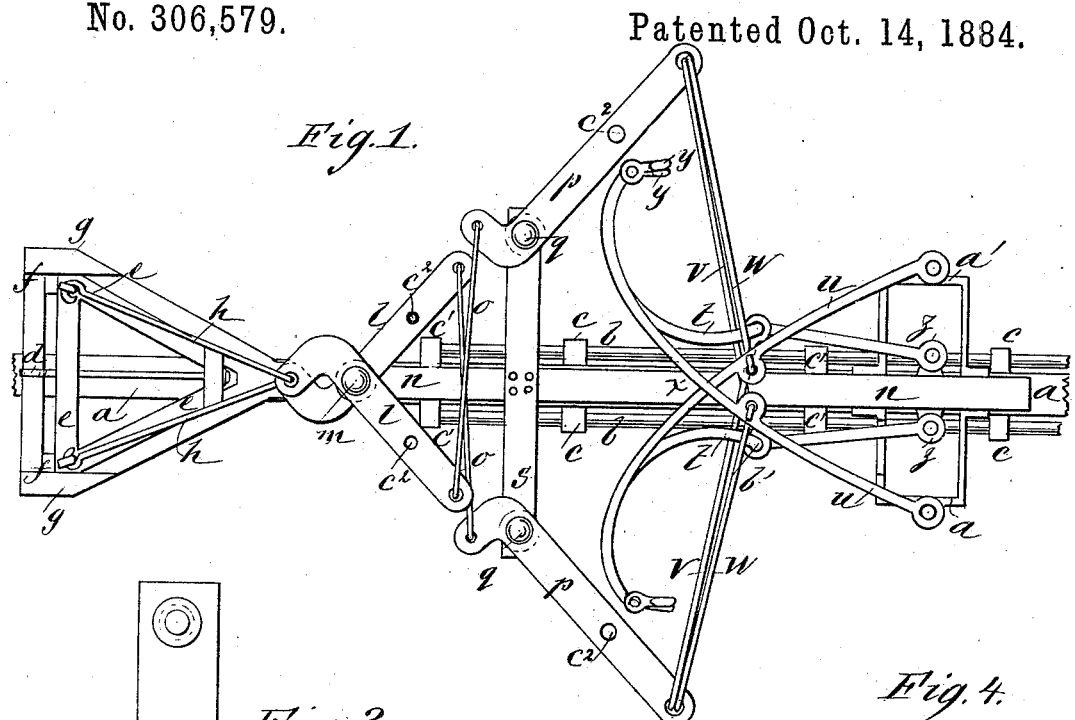

(No Model.) 2 Sheets—Sheet 2.

G. H. CHAPPELL.
DRAFT MECHANISM FOR VEHICLES.

No. 306,579. Patented Oct. 14, 1884.

WITNESSES:
Donn Twitchell
C. Sedgwick

INVENTOR:
G. H. Chappell
BY
Munn & Co.
ATTORNEYS.

UNITED STATES PATENT OFFICE.

GEORGE HENRY CHAPPELL, OF HURON, DAKOTA TERRITORY.

DRAFT MECHANISM FOR VEHICLES.

SPECIFICATION forming part of Letters Patent No. 306,579, dated October 14, 1884.

Application filed January 14, 1884. (No model.)

*To all whom it may concern:*

Be it known that I, GEORGE H. CHAPPELL, of Huron, county of Beadle, Territory of Dakota, have invented a new and Improved Compound Lever-Power Drawing Mechanism, of which the following is a full, clear, and exact description.

My invention consists of an improved contrivance of lever mechanism for applying the power for drawing wagons, cars, plows, and other objects, the said lever mechanism being adapted to multiply the force of the drawing power when first taking effect on the vehicle, car, or other object to which the said motor apparatus is applied, all as hereinafter fully described.

Reference is to be had to the accompanying drawings, forming part of this specification, in which similar letters of reference indicate corresponding parts in all the figures.

Figure 1 is a plan view of my improved draft apparatus. Figs. 2, 3, and 4 are plan views of modifications of some of the details. Fig. 5 is a side elevation of the apparatus as represented in Fig. 1.

The bar $a$ represents the tongue of a wagon, car, plow, or other object to which the draft apparatus is to be applied, and it has two rods, $b$, connected to the sides, respectively, by the four eye-studs $c$, so that the bar $n$, fitted on the tongue, and also connected with the rods $b$ by the eye-studs, staples, or other like objects, $c'$, may slide along the rods, and consequently along the tongue, of the wagon or other object to a limited extent; or the tongue may slide along the bar when the draft is applied to start the wagon or other device.

The wagon or other object to be drawn is to be hitched to the rod $d$, that is mounted on the small triangular frame $e$, arranged to slide forward and back in guides $f$ of the larger triangular frame $g$, permanently attached to the tongue $a$. The frame $e$ is connected by the rods $h$ with the short arms of a pair of elbow-levers, $l$, pivoted at $m$ to said bar $n$, which rests on the upper side of the tongue, and these bars are connected at the ends of their long arms by rods $o$ with the short arms of another pair of elbow-levers, $p$, pivoted at $q$ to a cross-bar, $s$, attached to bar $n$.

The long arms of levers $p$ are respectively connected to two levers, $t$ and $u$, by rods $v$ and $w$, there being separate and independent pairs of said levers $t$ and $u$ for each lever $p$, and said levers $t\,w$ are pivoted on opposite sides of the bar $n$ for their fulcrums; but levers $u$ cross over the tongue at $x$, where the two levers $u$ also cross each other, and said pairs of levers $t\,u$ curve outward and turn forward at their free ends, which range close together, and have hooks $y$, by which the team, locomotive, or other motive power is to be attached to them for applying the draft.

The levers $t$ are pivoted directly to the bar $n$ by the ear-lugs $z$; but levers $u$ are pivoted at some distance away from the bar laterally to the ends of a frame, $a'$, by which levers $u$ range suitably with levers $p$ to apply the draft to said levers $p$ to best advantage in the first part of the operation and while levers $t$ would be less effective, and levers $t$ come into their best action after levers $u$ have shifted with relation to levers $p$, so as to have less effect on them.

The levers $t$, being pivoted low down on the sides of the bar $n$, have an upward turn at $b'$, where they pass through the eyes of the draw-rods $v$, and said levers $t$, and also the levers $u$, are to have an upward curve from where they connect with the draw-rods to the outer ends, when horses are used for applying the draft to raise the hitching-point well upward with relation to the hind portion of the horses.

It will be seen that the lateral thrusts of all the levers employed in this apparatus neutralize each other on the bar $n$ and result in direct forward effect calculated to largely increase the direct pull of the force applied to the ends of levers $t\,u$.

For larger range of the pull-rod $d$, the levers $l$ and $p$ may be fitted with holes $c^2$, for shifting them along the fulcrum-pivots.

Instead of hitching to the levers $t\,u$ at $y$, said levers may be connected to an evener-plate, $d'$, Fig. 4, by passing them through slots $e'$, and the team or other means of applying the power may be hitched to said evener at $f'$. Levers of the form represented at $g'$, Fig. 3, may be used in lieu of the levers $p$, and the levers $t\,u$ may be dispensed with and ropes or chains used instead, with a cross-bar, $h'$, attached to the tongue, with a guide-pulley, $i'$, at each end, around which to run the rope to the end of levers $p$, for giving said ropes the right direction.

It is to be noticed that the diagonal pull of the rods $h$ on the corners of the triangular frame $e$ result in direct forward thrust on the draw-rod $d$, calculated to be equally as effective as the direct pull would be on said rod, and at the same time the rods range with the levers $l$, so as to be operated to better advantage by them than if in the line of the rod $d$.

The levers $l$ may be dispensed with and levers $p$ connected directly to the rods $h$; but the multiplying effect of the apparatus will be proportionately less.

When the apparatus is used on a locomotive or car for drawing another car, the tongue $a$ will not be employed, the bar $n$ being attached directly to the body of the locomotive or other pulling car.

Having thus described my invention, I claim as new and desire to secure by Letters Patent—

1. In a draft mechanism, the combination of connected counter-thrusting, multiplying pairs of levers $t\ u\ p\ l$ and means for their connection to the vehicle and to the draft power, substantially as and for the purpose set forth.

2. In a draft mechanism, the combination of connected counter-thrusting pairs of levers $t\ u\ p\ l$, connected to a support adapted to slide on the vehicle-tongue or draft-bar and to a sliding hitching-rod, the forward pair of said levers being capable of connection to the draft power, substantially as and for the purpose set forth.

3. The combination of duplicate levers $t\ u$ with a pair of levers, $p$, arranged to counteract the lateral thrust of one by the other, and also being arranged for successive action, substantially as described.

4. In a system of lever mechanism for increasing the effect of the power applied to the primary levers, said primary levers consisting of two levers, $t$, pivoted to the center bar, $n$, and connected to the secondary levers $p$ on one and the same side of said center bar, also two levers, $u$, which are mounted on fulcrums projected laterally from the center bar, $n$, and are connected to the secondary levers $p$, and which cross said center bar and range with the levers $p$ of the opposite side of the tongue for hitching to the team to enable said levers $t\ u$ to act successively on the levers $p$, substantially as described.

5. The combination, with the secondary counter-thrusting multiplying-levers $p$, of the pairs of counter-thrusting primary levers $t\ u$, constructed and arranged as described, for successive action on the said secondary levers, substantially as described.

6. The combination, in a draft apparatus, of the sliding triangular frame $e$, having the hitching-rod $d$, with the counter-thrusting levers $l$, and being connected to them by the diagonal rods $h$, substantially as described.

GEORGE HENRY CHAPPELL.

Witnesses:
A. S. HUDSON,
OLIVER G. McEUEN.